(No Model.) 4 Sheets—Sheet 1.

G. W. STAFFORD & W. EVANS.
PATTERN MECHANISM FOR LOOMS.

No. 466,874. Patented Jan. 12, 1892.

WITNESSES:
Albert E. Bodwell,
Chas. A. Pracy

INVENTORS
George W. Stafford
William Evans
By Benj. Arnold ATTORNEY

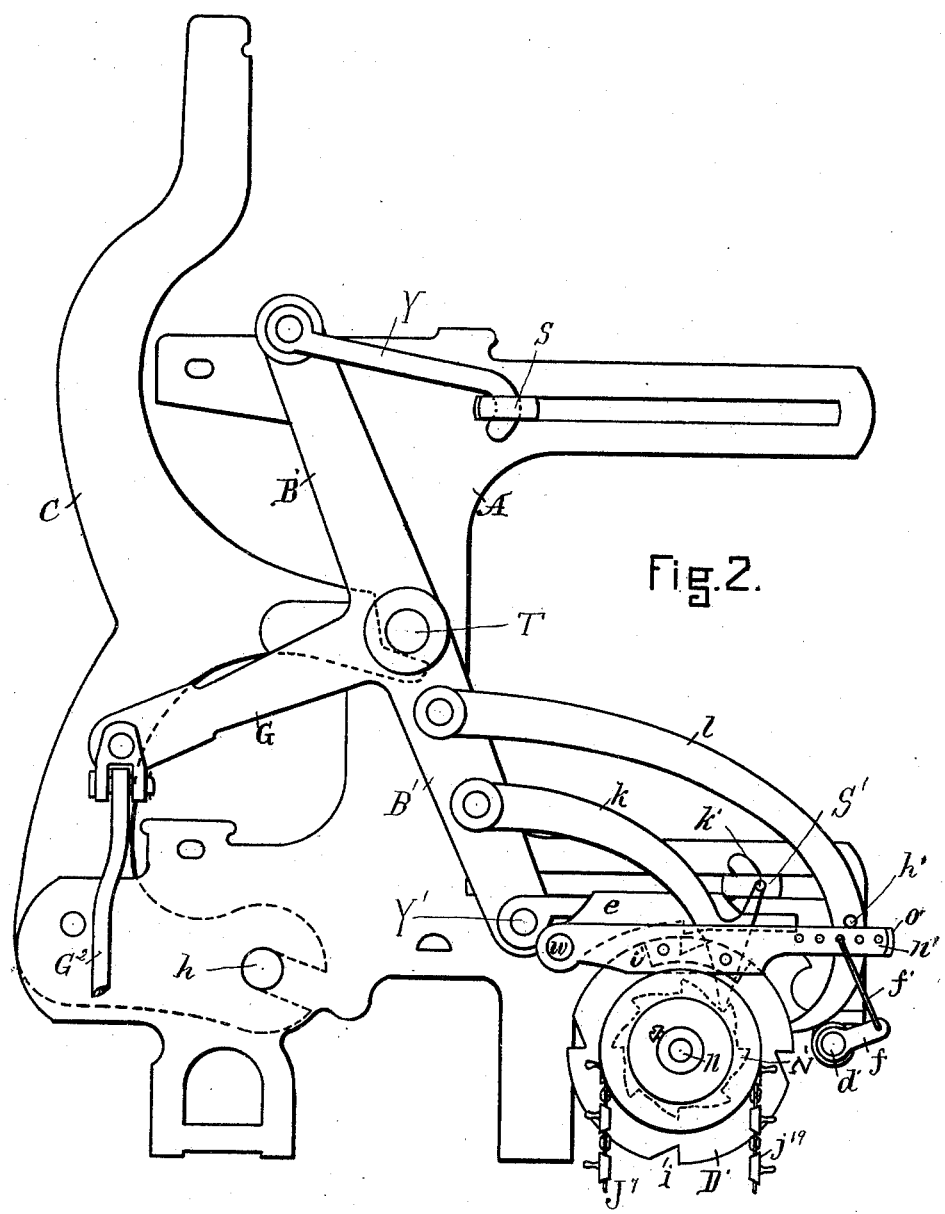

(No Model.)

4 Sheets—Sheet 3.

G. W. STAFFORD & W. EVANS.
PATTERN MECHANISM FOR LOOMS.

No. 466,874.

Patented Jan. 12, 1892.

WITNESSES:
Albert L. Bodwell,
Chas. A. Pracey

INVENTORS
George W. Stafford
William Evans
By Benj. Arnold
ATTORNEY (No Model.) 4 Sheets—Sheet 4.
G. W. STAFFORD & W. EVANS.
PATTERN MECHANISM FOR LOOMS.
No. 466,874. Patented Jan. 12, 1892.
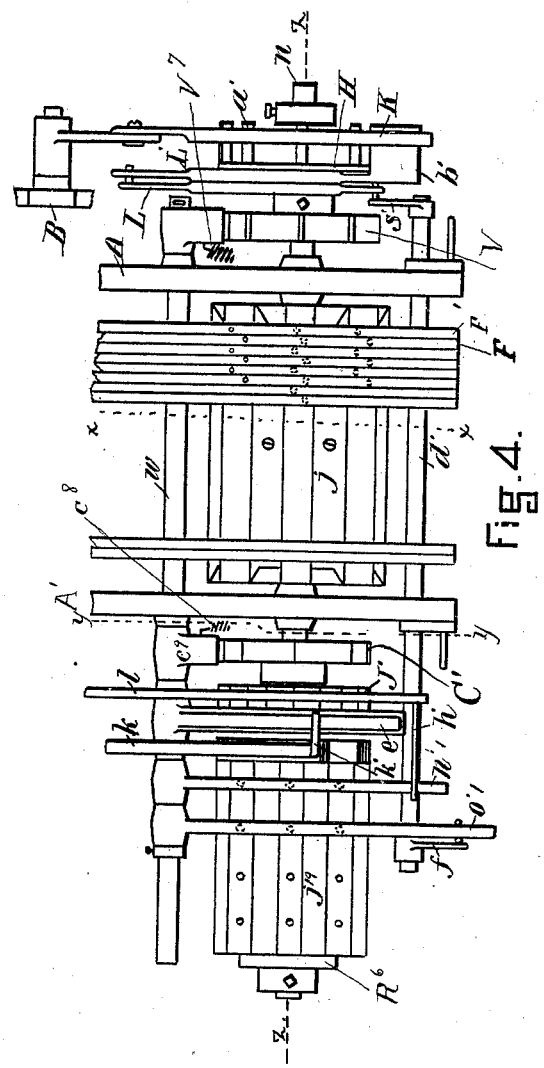
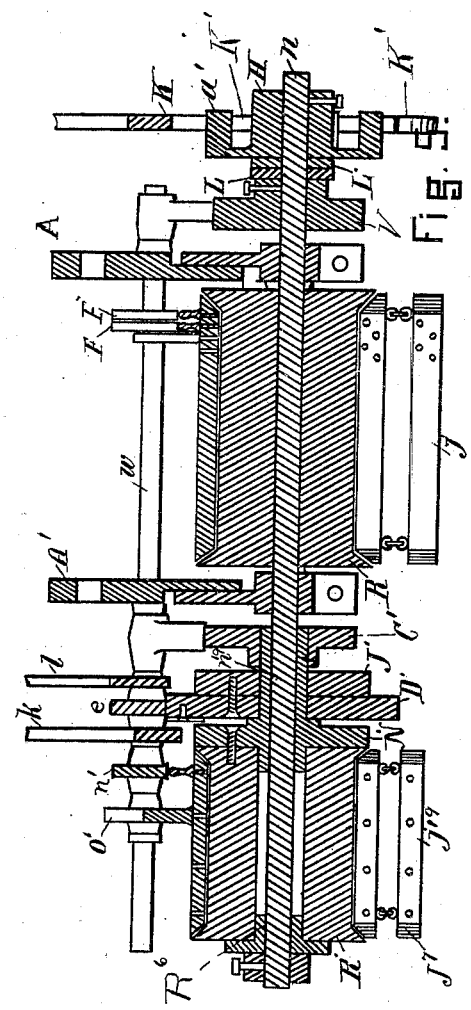
WITNESSES:
Albert L. Bodwell,
Chas. A. Pranny
INVENTORS
George W Stafford
William Evans
By Benj Arnold ATTORNEY

UNITED STATES PATENT OFFICE.

GEORGE W. STAFFORD AND WILLIAM EVANS, OF PROVIDENCE, RHODE ISLAND.

PATTERN MECHANISM FOR LOOMS.

SPECIFICATION forming part of Letters Patent No. 466,874, dated January 12, 1892.

Application filed December 30, 1890. Serial No. 376,223. (No model.)

*To all whom it may concern:*

Be it known that we, GEORGE W. STAFFORD and WILLIAM EVANS, of Providence, in the county of Providence and State of Rhode Island, have invented certain new and useful Improvements in Pattern Mechanisms for Looms; and we do hereby declare that the following is a full, clear, and exact description thereof, reference being had to the accompanying drawings, and to the letters of reference marked thereon, which form a part of this specification.

Our invention has particular relation to the pattern mechanism which is employed in looms for the purpose of determining the order in which the warp-threads shall be shed in the weaving of a fabric.

The main object of our invention is to render unnecessary the use in weaving certain classes of patterns of the long heavy and cumbrous pattern-chains which heretofore generally have been employed.

Our invention is particularly serviceable in cases where it is desired to weave webs of fabric having ornamental headings or cross-borders at intervals therein, such headings or borders being separated by lengths of simple body-weave.

Our invention consists in the combination, with a pattern-barrel, of mechanism such as will hereinafter be fully described, and will be particularly defined in the claims at the close of this specification, whereby—as, for instance, after the production of a heading or cross-border—the regular advance of the pattern-barrel and pattern-chain may be arrested and the pattern-barrel may be oscillated for as long a period as may be desired, so as to present alternately for action two of the bars of the pattern-chain, these two bars having indicators thereon suitably arranged for producing the desired body-weave.

Figures 1, 7, 8:
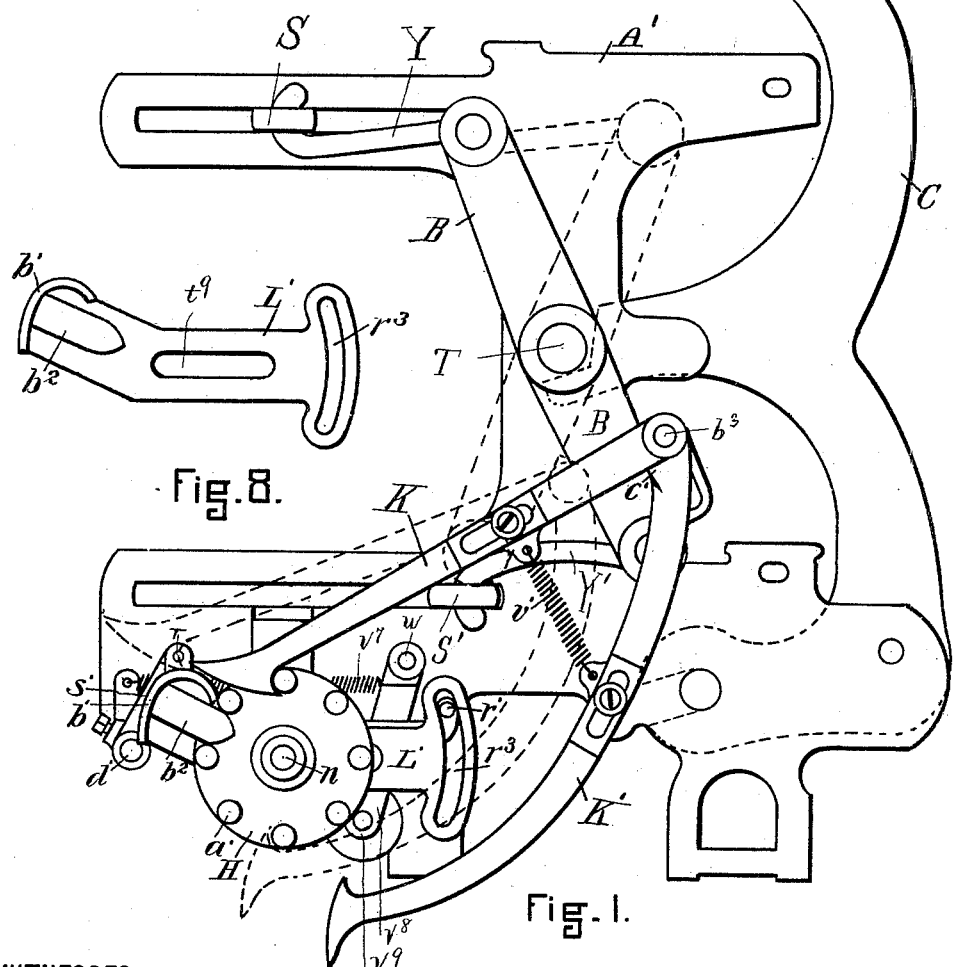
Figure 6:
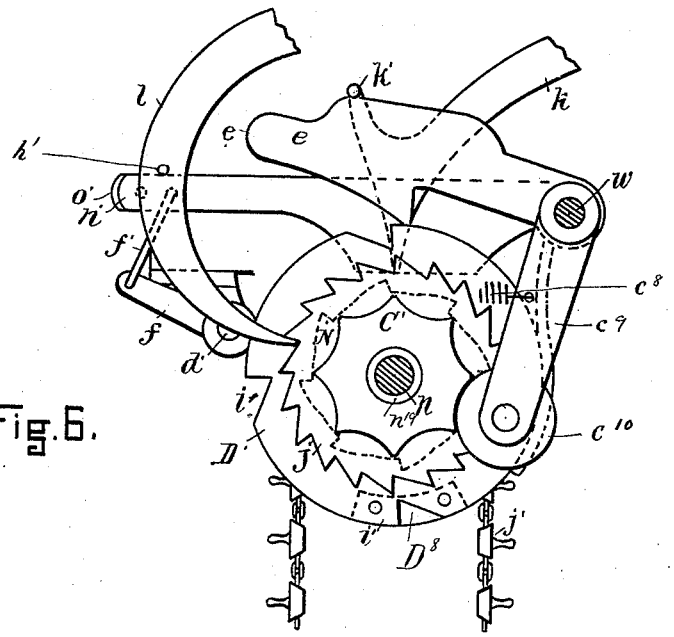
Figure 3:
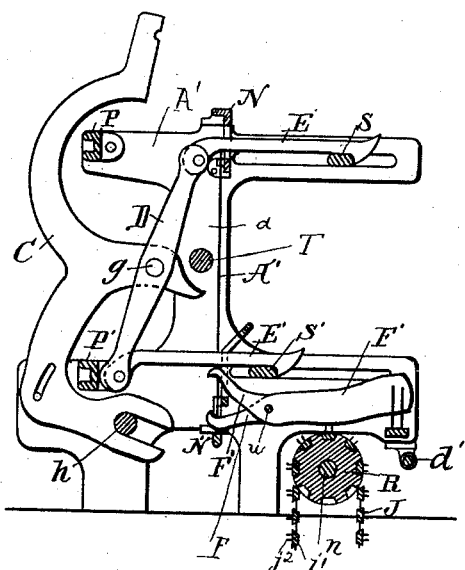

In the drawings, Figure 1 is a view in side elevation of a dobby for looms having our invention applied thereto, the view being of the side which is toward the front of the loom when the dobby is applied for use. Fig. 2 is a similar view showing the side of a dobby which is toward the rear of the loom. Fig. 3 is a view of a dobby in transverse section. Fig. 4 is a view in plan illustrative of our invention and showing the pattern-barrel of a dobby, indicator levers or fingers co-operating therewith, and devices embodying our invention for effecting and controlling the rotation of the said pattern-barrel. Fig. 5 is a view of the parts shown in Fig. 4, but showing the same in section on the line $z\ z$ in Fig. 4. Fig. 6 is a view of the devices at the left of the dotted line $y\ y$ in Fig. 4 and looking toward the left in said Fig. 4. Figs. 7 and 8 are views in side elevation of details hereinafter described.

In the drawings we have represented our invention as employed in connection with a well-known form of shedding mechanism for looms which is known as a "dobby." The invention, however, is capable of being employed in connection with other forms of shedding mechanism as well.

In the said drawings, A A' are the side frames of the dobby.

C is one of the harness-levers and is pivoted on the rod $h$, extending across from one side frame of the dobby to the other.

D is the connector or jack-lever, which is pivoted at $g$ to the said harness-lever.

E E' are the hooked jacks, which are pivoted to the opposite ends of the said connector or jack-lever D, and F F' are the indicator levers or fingers, sometimes called "plate-levers," which are pivoted side by side upon a rod $w$, mounted in the side frames A A', these indicator-levers being acted upon by the pins or indicators $j^2$, inserted in the bars $j'$ of the pattern-chain J, passing around the pattern-barrel R on the shaft $n$, the upper jack E having a wire $a$ interposed between it and the inner end of the corresponding indicator-lever F, while the lower jack E' rests upon the toe of the indicator-lever F'. There is in the form of dobby represented in Fig. 3 a separate lever F or F' for every hooked jack E or E'.

S S' are the lifters, the opposite ends whereof are connected by rods Y Y' with the ends of the arms B B', which are mounted on the rock-shaft T, the latter being supported in the side frames A A' and being provided with the arm G, that is integral with arms B', and is connected, as usual, by the rod $G^2$ with a suitable moving part in the loom, the said shaft T being given in operation one complete reciprocation for every two picks of the loom, as is customary.

The shaft $n$ of pattern-barrel R is provided, as usual, with a ratchet-wheel H, and with a rest or locking-wheel V, and with the notches in the periphery of the said wheel V engages the roller $V^9$ on the arm $V^8$, which arm is pivoted on the forward end of the rod $w$, and is acted upon by the spring $V^7$, so as to draw the said roller into the said notches. As usual, for the purpose of rotating the pattern-barrel we provide a pawl K, which is pivoted to the lower arm B on the rock-shaft T, and at each inward movement of the said lower arm this pawl K operates in connection with the ratchet-wheel H to advance the pattern-barrel one step, unless prevented from engaging with the teeth of the said ratchet-wheel by devices which we shall presently describe. The teeth of the ratchet-wheel H are formed, preferably, by pins $a'$, which are each inserted at one end in the side of the disk forming the body of the wheel, or are cast with said disk. On the pin $b^3$, which pivotally connects the pawl K with the lower arm B, is also pivoted a second pawl K$'$, which is so disposed relatively to pawl K and the ratchet-wheel H as to engage with the pins forming the teeth of the latter at a point which is on the opposite side of the center of the ratchet-wheel. The two pawls K K$'$ are drawn toward each other by a spring $v'$, by which they are connected together; but the approach of the two pawls to each other is limited by a stop $c'$, formed as a shoulder upon the pawl K$'$, and against which the side of pawl K comes to rest, so that only one of the said pawls can engage at one time with the teeth of ratchet-wheel H. So long as pawl K is allowed to engage regularly with the teeth of ratchet-wheel H and the pawl K$'$ remains out of engagement therewith the pattern-barrel will be advanced in the usual manner, step by step, and the bars of the pattern-chain will be presented for action in regular succession. This will be the case during the weaving of an ornamental heading or cross-border in the web being produced. When the border or heading is completed and a length of plain body-weave is to be produced before the next heading or cross-border is begun, the pawl K$'$ is caused to come into engagement with the ratchet-wheel H alternately with the pawl K in a manner to oscillate the pattern-barrel and present for action alternately two bars of the pattern-chain having the indicators thereon suitably arranged to provide for the production of the body-weave, these two bars being caused to act alternately, as stated, until the desired length of body-weave has been produced, when the pawl K$'$ is allowed to pass out of action and the next heading or cross-border is woven, and so on. For the purpose of bringing pawl K$'$ into action and causing it to alternate in action with pawl K during the desired period in the weaving, we provide the pawl-governor L$'$, which is shown separately in Fig. 8. This pawl-governor consists of a bar or plate which is slotted longitudinally at $t^9$ to enable it to be placed upon the shaft $n$ at the rear side of ratchet-wheel H and to be slid transversely thereof. At one end thereof the said bar or plate is provided or formed with a pawl-deflector $b'$, formed as a curved plate or flange extending laterally alongside the pins forming the teeth of the ratchet-wheel H, and the said pawl-deflector is provided or formed with a spur or tongue $b^2$, adapted to enter between any two adjacent teeth of the ratchet-wheel when the bar or plate is slid longitudinally across shaft $n$ toward the right-hand side in Fig. 1 of the drawings. When the said bar or plate has been thus slidden in this direction and thereby the spur or tongue $b^2$ has been caused to enter between two teeth of ratchet-wheel H, the pawl-governor will be coupled with the ratchet-wheel, so as to turn therewith. The next forward movement of the ratchet-wheel occasioned by the inward movement of pawl K will carry the pawl-governor around into such position that when the pawl K moves outward again it will ride up on the pawl-deflector $b'$. This will not only raise the said pawl up out of engagement with the teeth of ratchet-wheel H and prevent the said pawl from acting in its next inward movement to partially rotate the ratchet-wheel and pattern-barrel R, but will lift the pawl K$'$ up into engagement with the teeth of ratchet-wheel H on the opposite side of the center of such wheel, so that as the pawls move inward the ratchet-wheel and pattern-barrel will be moved by pawl K$'$ a step in the direction which is the reverse of that in which they before were moved by the action of pawl K. The ratchet-wheel and pattern-barrel having been thus reversely rotated one step, the pawl-deflector will be carried back thereby from under pawl K, and now the latter will be permitted to act again to move the ratchet-wheel and pattern-barrel forward one step. This movement will bring the pawl-deflector under pawl K again and cause such pawl to be rendered inoperative and pawl K$'$ operative again, and so on until the pawl-governor is moved reversely to disengage the spur or tongue $b^2$ from the teeth of the ratchet-wheel.

We prefer in practice to operate the pawl-governor automatically, and in the drawings we have illustrated one form of the devices which we employ for the purpose of moving the said pawl-governor into and out of operative connection with the ratchet-wheel. These devices are constructed as follows: L is a bar or plate which is placed at the side of bar or plate L$'$, and slotted at $t$ to slide transversely upon shaft $n$. At one end this bar or plate L is provided with a pin $r'$, which enters a curved slot $r^3$ in the bar or plate L$'$, this mode of connection causing the two bars or plates to move endwise together and permitting bar or plate L$'$ to swing vertically at the side of bar or plate L without becoming disconnected therefrom. For the purpose of moving the bar or plate L endwise, it is formed with a hole at the outer end thereof, this hole receiving a pin $r$ at the upper end of an arm $s'$, fixed to the forward end of a rod $d'$, which is mounted in bearings in the outer ends of the side frames A A'. The rear end of the rod $d'$ has fixed thereto an arm $f$, which is connected by a rod $f'$ with the free end of an indicator lever or finger $o'$, mounted on the rear end of rod $w$ and acted upon by one of the rows of indicators on the bars $j^{19}$ of a pattern-chain $J^7$ passing around the pattern-barrel R', which latter is mounted loosely on the rear end of shaft $n$. The shaft $n$ and the rod $w$ are extended rearwardly beyond the side frame A' for the purpose of supporting certain parts which are applied thereto. The outer end of the pattern-barrel R' has applied thereto a collar $R^6$, turning upon the outer end of the shaft $n$, and at its inner end the pattern-barrel R' is connected with the sleeve $n^{19}$, also turning on the shaft $n$. To the sleeve $n^{19}$ is applied a ratchet-wheel N', which is engaged by the pawl $k$, connected with one of the arms B' at the corresponding end of the rock-shaft T. To the sleeve $n^{19}$ is applied also a notched rest or locking-wheel C', with which co-operates a roller $c^{10}$ on the locking-arm $c^9$, which is acted upon by a spring $c^8$. By its engagement with the ratchet-wheel N', the pawl $k$ serves to rotate the pattern-barrel R'.

For the purpose of leaving the pattern-barrel R' stationary when no change is necessary in the position occupied by shifting plate or bar L the engagement of the pawl $k$ with the ratchet-wheel N' is controlled by means of the devices which we shall now proceed to describe. The pawl $k$ is provided with a pin or projection $k'$, which overhangs the upper edge of the indicator-lever $e$, mounted on the rod $w$, the said indicator-lever having a projection thereon which bears against the periphery of a disk D', which, with the ratchet-wheel J', connected therewith, is mounted to turn loosely upon the sleeve $n^{19}$. In the periphery of the disk D', at suitable intervals, are formed notches $i'$, into which the projection of the indicator-lever $e$ may drop, and while the lever $e$ is in its lower position, in consequence of its projection having entered a notch or depression in the disk D', the pawl $k$ is permitted to engage with the ratchet-wheel N' and rotate the pattern-barrel R'. The ratchet-wheel J' is engaged by the pawl $l$, which is pivoted to the lower arm B'. The pawl $k$ being a push-pawl and the pawl $l$ being a draw-pawl, these two pawls act alternately in occasioning the rotation of their ratchet-wheels, although both pawls are pivoted to the same actuating-arm. When it is desired that a notch $i'$ in the disk D' shall not be entered by the lever $e$ when such notch is presented under the said lever, a plate $D^8$ (shown in Fig. 6) is screwed to the side of the disk D', so as to bridge the said notch and prevent the said lever $e$ from entering the same. In order to occasion dwells in the rotation of the disk D', we provide the pawl $l$ with a stud or pin $h'$, which extends laterally over the indicator-lever $n'$, that is pivoted on the rod $w$ and rests upon the pattern-chain $J^7$. When a pin upon the said pattern-chain acts to raise the indicator-lever $n'$, the pawl $l$ is lifted out of engagement with the ratchet-wheel J'. It will be apparent that the rotation of the pattern-barrel R' is controlled by the disk D', and that in turn the rotation of the disk D' is controlled by certain of the indicators on the pattern-chain $J^7$, passing around the pattern-barrel R'.

The devices which we have shown and described permit of the employment of a pattern-chain having indicators for a heading or cross-border, or the like, applied to a successive series of the bars thereof, and having indicators suitably arranged to produce the body-weave which follows such heading or cross-border applied to the two bars which come next to the said series, the pattern-chain being advanced step by step throughout the production of the ornamental portion, but being given reciprocating or oscillating movements during the production of the body-weave, so as to cause the two bars referred to to act alternately for as long a period as may be desired, after which the continuous advance during the production of another ornamental portion is resumed.

We do not lay claim herein to the particular devices herein shown and described, whereby the rotation of the pattern-barrel R' is controlled.

We claim as our invention—

1. The combination, with a pattern-barrel and driving means therefor constructed to rotate the said barrel in either direction, as desired, of a governing device controlling the said driving means and operative to occasion successive reversals of the rotation of the pattern-barrel on adjacent lines of pattern-indicators, auxiliary pattern devices whereby said governing device is thrown into and out of action when required, and separate driving connections for actuating the said auxiliary pattern devices, substantially as described.

2. The combination, with a pattern-barrel, its ratchet-wheel, two pawls, and means for actuating said pawls to cause them to rotate the ratchet-wheel and pattern-barrel, the said pawls being arranged to act oppositely and thereby to move the said ratchet-wheel and pattern-barrel reversely, of a pawl-governor, whereby the pawls may be rendered operative alternately to occasion successive reversals of the rotation of the pattern-barrel on adjacent lines of pattern-indicators, and auxiliary pattern devices, whereby said pawl-governor is thrown into and out of action when required, substantially as described.

3. The combination, with a pattern-barrel, its ratchet-wheel, two pawls which engage with the teeth of the said ratchet-wheel on opposite sides of the center thereof, one of the said pawls having a stop to limit the approach of the two pawls to each other, a spring acting to draw the said pawls toward each other, means to actuate the said pawls, of a pawl-governor having a tooth for engagement with the teeth of the ratchet-wheel and also a pawl-deflector, substantially as described.

4. The combination, with a pattern-barrel, its ratchet-wheel, two pawls which engage with the teeth of the said ratchet-wheel on opposite sides of the center thereof, one of the said pawls having a stop to limit the approach of the two pawls to each other, a spring acting to draw the said pawls toward each other, means to actuate the said pawls, of a pawl-governor $L'$, mounted to slide transversely of the shaft of the pattern-barrel and formed with a slot $r^3$, and also having a pawl-deflector and a tooth for engaging with the teeth of the ratchet-wheel, a bar or plate $L$, having a pin which enters slot $r^3$, an arm with which said bar or plate $L$ is pivotally connected, a rod on which said arm is mounted, and auxiliary pattern devices connected with said rod for turning the same and effecting the movement of the pawl-governor, substantially as described.

GEO. W. STAFFORD.
WILLIAM EVANS.

Witnesses:
CHARLES H. POLAND,
BENJ. ARNOLD.